US010834041B2

(12) United States Patent
Gupta et al.

(10) Patent No.: US 10,834,041 B2
(45) Date of Patent: Nov. 10, 2020

(54) BLOCKMAIL TRANSFER PROTOCOL

(71) Applicant: International Business Machines Corporation, Armonk, NY (US)

(72) Inventors: Deepak Gupta, Noida (IN); Namita Gupta, Noida (IN); Siddharth Saraya, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 15/946,458

(22) Filed: Apr. 5, 2018

(65) Prior Publication Data

US 2019/0312831 A1    Oct. 10, 2019

(51) Int. Cl.
*H04L 12/58* (2006.01)
*H04L 9/32* (2006.01)

(52) U.S. Cl.
CPC ............ *H04L 51/12* (2013.01); *H04L 9/3236* (2013.01); *H04L 51/04* (2013.01); *H04L 51/08* (2013.01); *H04L 51/16* (2013.01)

(58) Field of Classification Search
CPC ......... H04L 51/04; H04L 51/08; H04L 51/12; H04L 51/16; H04L 9/3236
See application file for complete search history.

(56) References Cited

U.S. PATENT DOCUMENTS

| 10,114,969 | B1* | 10/2018 | Chaney | ............... | G06F 21/6218 |
| 10,417,188 | B2* | 9/2019 | King | .................... | G06F 16/137 |
| 2002/0059384 | A1* | 5/2002 | Kaars | .................... | H04L 51/08 709/206 |
| 2003/0158903 | A1* | 8/2003 | Rohall | ................. | G06Q 10/107 709/206 |
| 2016/0212093 | A1 | 7/2016 | Meixler | | |
| 2017/0359288 | A1* | 12/2017 | Golan | ..................... | H04L 69/22 |

OTHER PUBLICATIONS coindesk.com. "How do Bitcoin Transactions Work?". pp. 1-2. Jan. 29, 2018 (Year: 2018).*
Lotz, Linus, Dark Internet Mail Environment, Sep. 2015, Seminar Future Internet SS2015 Chair for Network Architectures and Services, Department of Computer Science, Technische Universität München E-mail: lotz@in.tum.de.
Warren, Jonathan, Bitmessage: A Peer-to-Peer Message Authentication and Delivery System, Nov. 27, 2012, jonathan@bitmessage.org, www.Bitmessage.org.
Bersier, Dr. Florian, et al., Email Stamping: Gmelius Blockchain Architecture, Aug. 25, 2017, Version 1.1.

* cited by examiner

*Primary Examiner* — John M MacIlwinen (57) ABSTRACT

An example operation may include one or more of receiving an electronic message from a sender that is intended for a recipient, breaking-up the electronic message into a plurality of message components and storing each message component in a respective block from among a plurality of blocks, linking the plurality of blocks of the broken-up electronic message together in a chain such that each successive block in the chain includes a hash of content included in a previous block of the chain, and transmitting the hash-linked chain of blocks of the broken-up electronic message via a network to the recipient.

22 Claims, 6 Drawing Sheets

FIG. 2

FIG. 3A
(Single Message)

FIG. 3B
(Reply Message)

BLOCKMAIL TRANSFER PROTOCOL

TECHNICAL FIELD

This application generally relates to a protocol for transferring electronic messages, and more particularly, to a system that breaks-up an electronic message into a hash-linked chain of blocks during transmission.

BACKGROUND

Electronic messages such as email, instant message, text message, and the like, are very common for anyone who has access to the Internet. For example, a user may send and receive hundreds or even thousands of electronic messages on a daily basis. One such example of an electronic message is an email that has evolved over time and includes an initial message along with reply and forward mechanisms that can often create a significant thread of messages. For a standard email protocol such as Simple Mail Transfer Protocol (SMTP), when a reply email or a forward email is sent, a copy of each previous email in the thread is included in the current email. In other words, when a new email is added to the thread and sent over the network the newly added email to the thread causes a redundant transmission of previous email content in the thread. This redundancy can occupy network bandwidth used for mail communications and take up additional storage space at email servers.

Furthermore, due to how SMTP protocol is structured, when an email is forwarded or a reply email message is sent, the original properties (e.g., content, font size, color, format, spacing, etc.) of the preceding email in the thread may be lost or modified through a user action or an involuntary software editing process. In other words, there is no way to verify or guarantee that the same message content in a previous message of a thread is being copied each time new messages are added to the thread. Therefore, the message content may be manipulated.

Accordingly, what is needed is a new message transfer protocol that can reduce redundant transmissions and improve security of original message content.

SUMMARY

One example embodiment may provide a method that includes one or more of receiving an electronic message from a sender that is intended for a recipient, breaking-up the electronic message into a plurality of message components and storing each message component in a respective block from among a plurality of blocks, linking the plurality of blocks of the broken-up electronic message together in a chain such that each successive block in the chain includes a hash of content included in a previous block of the chain, and transmitting the hash-linked chain of blocks of the broken-up electronic message via a network to the recipient.

Another example embodiment may provide a system that includes one or more of a processor configured to one or more of receive an electronic message from a sender that is intended for a recipient, break-up the electronic message into a plurality of message components, store each message component in a respective block from among a plurality of blocks, and link the plurality of blocks of the broken-up electronic message together in a chain such that each successive block in the chain includes a hash of content included in a previous block of the chain, and a network interface configured to transmit the hash-linked chain of blocks of the broken-up electronic message via a network to the recipient.

A further example embodiment may provide a system that includes one or more of a network interface configured to receive a hash-linked chain of blocks that are generated from an electronic message broken-up into a plurality of blocks, and a processor configured to one or more of validate the hash-linked chain of blocks via a hash validation that verifies hashed message content included in each successive block in the chain of blocks, and in response to validation of the hash-linked chain of blocks, reconstruct the electronic message based on message content that is included in the hash-linked chain of blocks, wherein the network interface is further configured to transmit the electronic message that has been reconstructed from the hash-linked chain of blocks to the recipient.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which support a blockmail transfer protocol. The system described herein can be used to enhance the security and reduce the storage needed for electronic messages such as electronic mail (email), text messages, instant messages, and the like. The blockmail transfer protocol leverages various attributes that are inherent in a blockchain storage process such that less network bandwidth is used and mails occupy less storage space for repeated content. An electronic message can be divided into a plurality of blocks. For example, different message parts (e.g., sender, recipient, CC, BCC, subject, body, attachment, signature, etc.) may be stored in different blocks. The blocks can be linked together using a hash function such that each block stores a hash of content from a previous block in the chain. The message is then transmitted as the plurality of blocks rather than as a typical message.

At the receiving side, the blocks are received and validated. For example, prior to or during the reconstructing of the chain of blocks, a cryptographic hash may be used to decrypt the hash links thereby validating the linking (i.e., using the hash of the previous block etc.), and ensuring that the integrity is maintained (i.e., the previous block has not been altered, etc.). If the block content is validated, the receiving system may assemble the original electronic message from the message content stored in the blocks. The blocks may include local IDs identifying a sequence or an order between the blocks, as well as a common ID identifying each block associated with the same electronic message.

Most related messaging protocols rely on Simple Mail Transfer Protocol (SMTP) which is an Internet standard for electronic mail transmission defined by RFC 821, and extended by RFC 5321. SMTP is often used by mail applications to send a message and relay the message, while client applications may use IMAP or POP3 to retrieve the messages. Although in widespread use, SMTP has some significant drawbacks including duplicate space used by a single email sent to multiple users (all users store it in their Inbox), and duplicate space used when Reply/Forward is used. For example, when user A sends EMAIL1 to user B, and then user B replies with history to A with EMAIL2, then EMAIL2 has EMAIL1 as part of its "DATA". This becomes double storage—and is compounded each time a new message is added to the thread of emails.

Other drawbacks with SMTP include that the properties an email may be lost—like digital signature or encryption. For example, assume user A sends encrypted EMAIL1 to user B, and then user B forwards the mail to users A & C with EMAIL2. Now since user B has forwarded the message, the encryption of EMAIL1 is lost and user C is able to see this email as part of EMAIL2 even though user C was not an intended recipient of user A that initially transmitted the encrypted message. Another drawback is that the data integrity is lost. For example, if user B alters the content of EMAIL1 before forwarding, user C has no means of finding out this change. Another issue can occur when the same information is stored multiple times. For example, if user A sends 10 emails to user B, the signature of user A is stored in B's inbox 10 times. Another drawback is that the information is not dynamic. In the above example, if user A's phone number changes, the signature of user A stored in user B's inbox is still the old phone number. Also, in the case of a long chain of emails, the linking can be lost, if more emails are attached in between. Also, auditing of email is an issue, because a user can always edit the email in their inbox and save it back.

The example embodiments establish an alternative message protocol that can be used instead of SMTP. The protocol implements blockchain technology by storing various logical parts of an electronic message in blocks and linking the blocks together to form a mail thread. The protocol may be performed by messaging servers (e.g., mail servers) on the web which break-up a message from a sender and which reconstruct the message for a recipient. For repetitive blocks which have already been shared between sender/receiver, only a reference to the previous block may be affixed or otherwise added to the message thread instead of sending the entire data thus decreasing the network usage and storage of messages.

In some embodiments, dynamic updates on blocks such as the signature block may be performed and real time accuracy of such information even in previous messages can be dynamically established. Accordingly, a user does not need to reference to the latest message of a person to see the person's latest signature. For any encrypted message, even on forwarding that referenced block would remain encrypted thereby preventing the message from being modified by additional readers of a chain of messages who are not authorized.

As described herein, a chain, also referred to herein as a blockchain, is a transaction log which is structured as hash-linked blocks, and each block may contain message content, metadata, and the like, of an electronic message. The block header may include a hash of the block's content, as well as a hash of a prior block's header and/or message content. In this way, all blocks in the chain of a broken-up electronic message may be sequenced and cryptographically linked together. Accordingly, it is not possible to tamper with the block data without breaking the hash links. A hash of a most recently added blockchain block represents each part of the message on the chain that has come before it, making it possible to ensure that the server can validate the chain integrity. The chain may be stored on a file system (i.e., local, attached storage, cloud, etc.) of a server, efficiently supporting the append-only nature of the blockchain workload.

Figure 1:
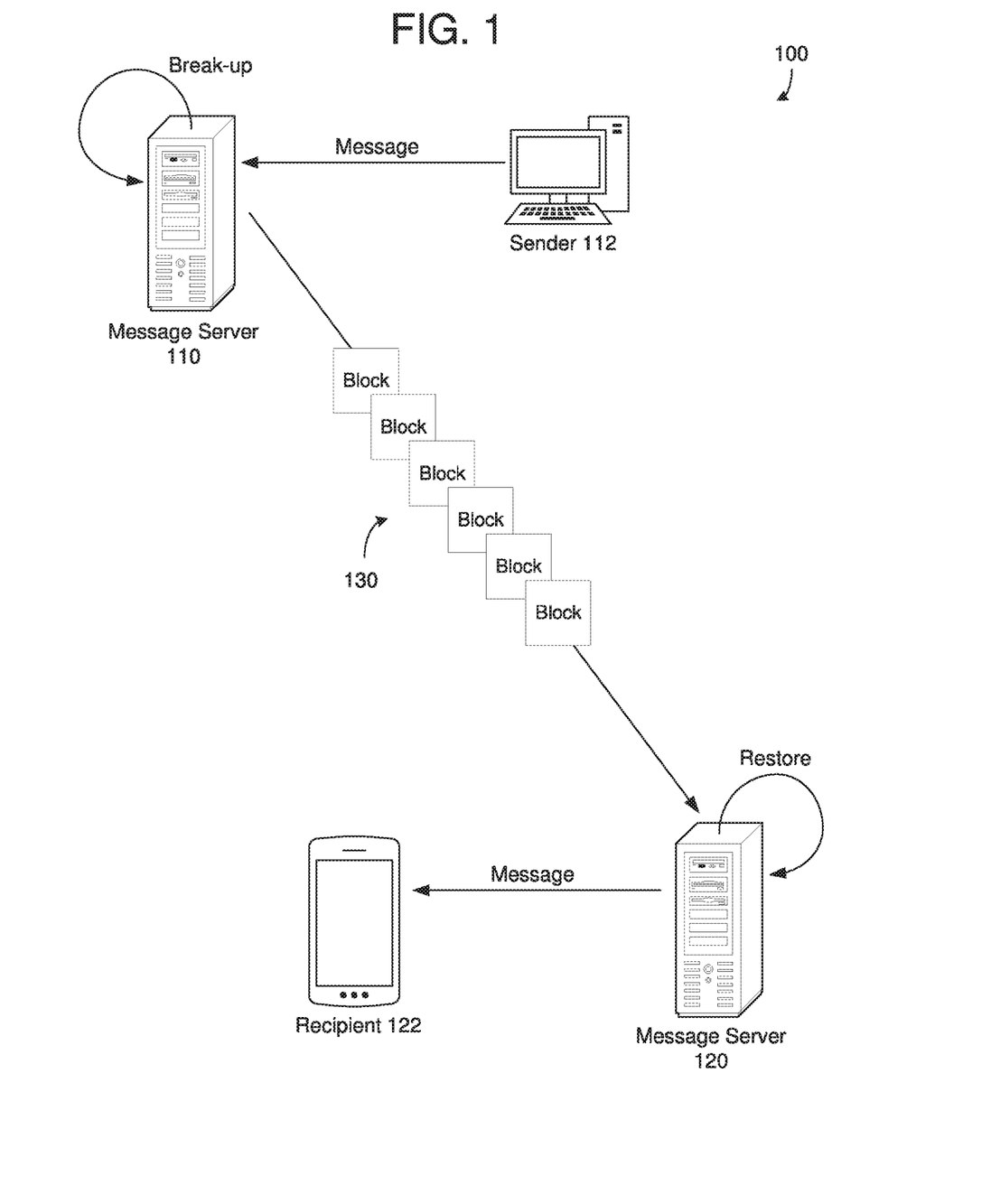
FIG. 1 is a diagram illustrating a system that transmits electronic messages according to a blockmail protocol, according to example embodiments.

FIG. 1 illustrates a system 100 that transmits electronic messages according to a blockmail protocol, according to example embodiments. Referring to the example of FIG. 1, a sender 112 is sending an electronic message to a recipient 122. For example, each of the sender 112 and the recipient 122 may be associated with devices such as desktop computers, laptops, smartphones, smart-wearable devices, tablets, appliances, and the like. Here, each of a message server 110 associated with the sender 112 and a message server 120 associated with the recipient 122 may have a blockmail transfer protocol software installed and executing therein. When the sender 112 hits "send" on an electronic message, the electronic message may be sent to the message server 110. In response, the message server 110 may break-up the electronic message into a plurality of blocks where each block stores different parts of the message.

There is no limit to which parts of the message are stored in which blocks. For example, the internal message data, metadata, sender/recipient information, CC/BCC information, subject, attachments, body, and the like, of a message may be stored in any amount of blocks. Also, some message parts may be spread out over more than one block, or combined into a single block with other message parts. For purposes of example, the different parts of a message may each be stored in a separate respective block. The blocks may be linked together via a hash function to form a hash-linked chain of blocks 130. Each successive block in the hash-linked chain 130 may include hashed content from a previous block. For example, a second block in the chain may include hashed content of the first block in a chain, a third block in the chain may include hashed content of the second block in the chain, and so on. Also, the blocks of a same message may be assigned a common identifier that is common to all blocks in the same message. In addition, the blocks of the same message may be assigned unique block identifiers which distinguish the different blocks within the same message.

In FIG. 1, the hash-linked chain of blocks 130 are transmitted the messaging server 110 of the sender 112 to the messaging server 120 of the recipient 122. In response, the messaging server 120 may validate the hash-linked chain of blocks 130 using the hash function to verify the integrity of the blocks. In response to validating the hash-linked chain of blocks 130, the messaging server 120 may assemble the original electronic message from content that is stored in each of the blocks and transmit the reconstructed message to the recipient 122. The blocks may also be linked to each other using a combination of block ID (unique) and message ID (common). While re-constructing the chain of blocks 130, the cryptographic hash may help in validating the linking (i.e. validating using the hash of the previous block), and ensuring that the integrity is maintained (i.e. no one altered the previous block). During reconstruction, the messaging server 120 may pull the chain of blocks 130 using the block IDs and message ID and validate the linking using the cryptographic hash validation. Further, the messaging server 120 may reconstruct the blocks and gather information such as previous message data in the chain from common databases.

Figure 2:
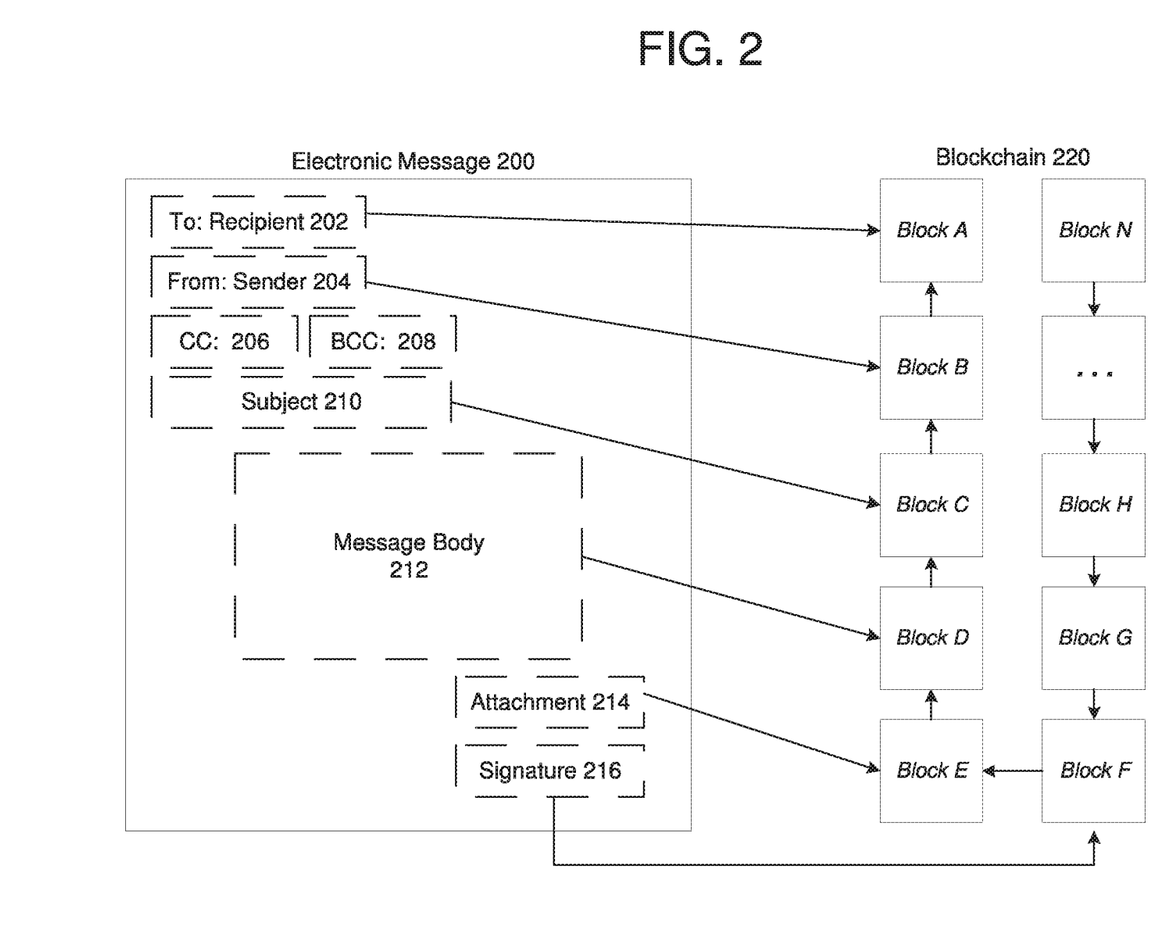
FIG. 2 is a diagram illustrating a process of breaking-up an electronic message into a plurality of blocks, according to example embodiments.

FIG. 2 illustrates a process of breaking-up an electronic message 200 into a plurality of blocks, according to example embodiments. For example, the process may be performed by a computing device such as a mail server, a user device, a relay server, a combination thereof, and the like, in which blockmail transfer protocol software is installed. Referring to FIG. 2, the electronic message 200 may be an email, a text message, an instant message, or the like. In this example, the message 200 includes a plurality of message parts such as a recipient 202, a sender 204, a carbon copy (CC) 206, a blind carbon copy (BCC) 208, a subject 210, a message body 212, an attachment 214, and a signature 216. In this example, it is assumed that the CC 206 and the BCC 208 are blank. Meanwhile, the remaining fields of the message parts include content. Accordingly, the message 200 may be broken-up into a plurality of blocks in the blockchain 220 such that each message part which includes content is assigned a respective block in the blockchain 220.

During the breaking-up process, the message content from the electronic message 200 may be extracted and stored in the blocks of the blockchain 220. Here, the blocks may be logical blocks and may be linked to one another via a hash function and be a dual ID process. Also, the message data that is stored in each block may be encrypted using public-private key pairs which are generated and certified by a common authority. The public keys are available to everyone, either in a central place or can be looked up from the common authority. The private keys may be available to only individual parties and may be used for digital signatures (signature 216) and email encryption.

Using blockchain technology, the electronic message 200 may be broken up into multiple blocks, where each logical piece of the mail constitutes a block. For unique identification of the blocks each block may include a unique block ID as well as a common message ID. In the example of FIG. 2, the message parts may each be stored in a respective block. For example, the to recipient 202 may constitute a block. Similarly, CC 206 and BCC 208 may constitute two other blocks. The subject 210 may be formed as a separate block. Meanwhile, the body 212 of the email would be another block. In some cases, the sender may be its own block 204 or the signature 216 may be used to represent the sender. In addition, attachments 214 may be a separate block. Although not shown in FIG. 2, any additional attributes such as return receipt, high importance, cannot be forwarded, and the like, may be stored in another block. Properties like digital signing, encryption, and the like, may be applied on relevant blocks, or as per user configuration.

When a new message is written, the message content is entered. The individual fields are created as blocks. Post write-up when the user clicks on send, the entered data is validated for undermentioned pieces at the client side of the sender. An EMAIL BLOCK (EB1) may be created with a unique block ID which links the various blocks that constitute that email. The DATA, SUBJECT, TRAILER, etc. blocks are constituted from the written email, and the RCPT, SIGNATURE etc., blocks may be linked based on the user ID. If the message is a REPLY or FORWARD email, the EMAIL BLOCK (EB1) of original email may be linked to this new EMAIL BLOCK (EB2) created. In this example, the sender can not change or edit EB1 (leveraging the Blockchain properties where blocks can not be altered once signed off—except when authorized). In this example, if EB1 is encrypted, the recipient of EB2 is only be able to see the contents which are new to EB2 (and not be able to view the contents of EB1 unless he has the key to decrypt that).

The signature BLOCK may be linked to the user, and user may have authority to change it. Because EMAIL BLOCKs have links to this BLOCK and email is constituted at run time whenever viewed, it carries real-time information. The blocks like TRAILER BLOCKS, etc. can be linked to a server such as an organization appends to every email that goes out of its domain. These can also be linked such that they are not stored every time. And real time updates (like Signature block) can be performed. At the recipient side, the EMAIL BLOCK is received which has information of all blocks to be linked to constitute the email. These blocks are linked and email is reconstituted to build the entire mail trail. Meanwhile, at the server side, the replica of messages may be stored. Here, the storing mechanism may include blocks stored separately where each block has data pertaining to it.

Figure 3A:
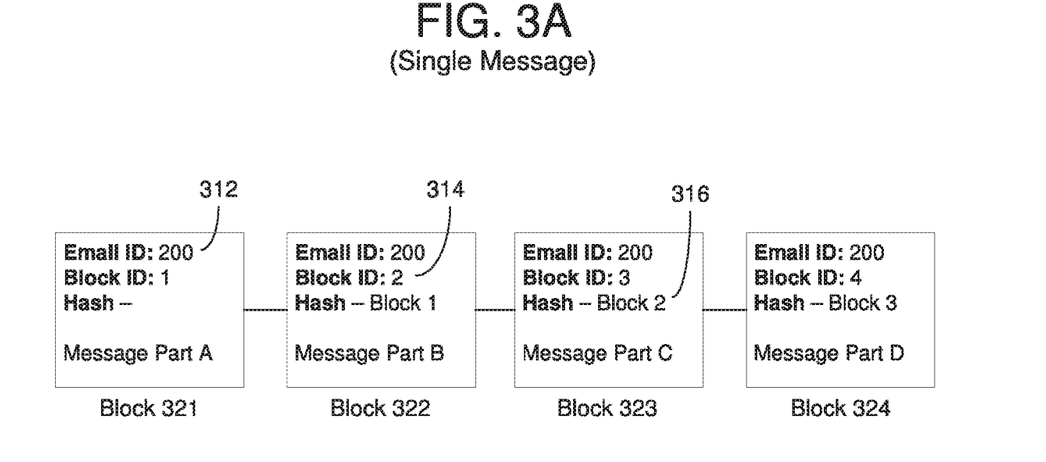
FIGS. 3A-3B are diagrams illustrating content which may be included within a hash-linked chain of blocks, according to example embodiments.
Figure 3B:
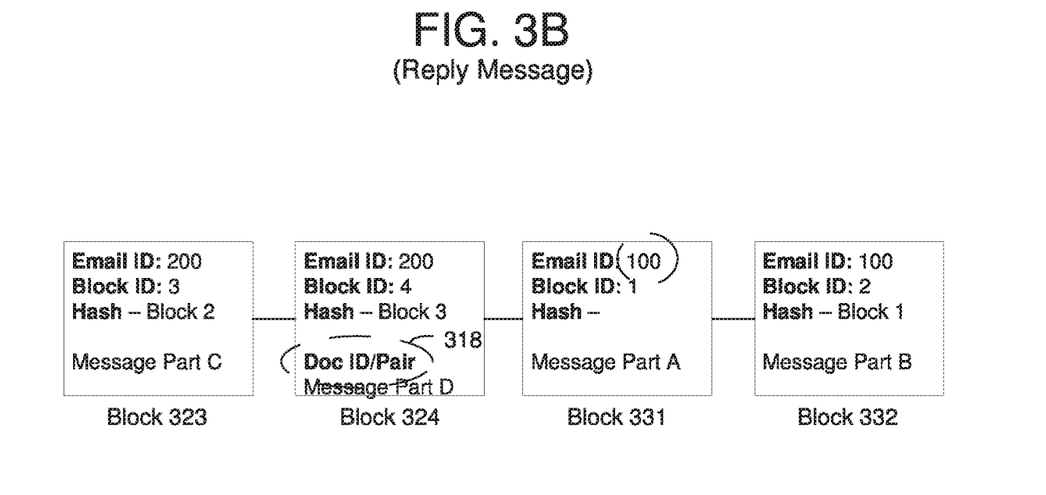

FIGS. 3A-3B illustrate block content which may be included within a hash-linked chain of blocks, according to example embodiments. FIG. 3A illustrates an example of a single message blockchain of blocks. In this example, a message is broken up into at least four data blocks 321-324 which each include respective message content of the message. In this example, each block includes a common message identifier 312 which is the same across all blocks 321-324 because the blocks are from a common message. Meanwhile, each block also includes a unique block identifier 314 which is different for each block in the same chain/message. In some embodiments, the block IDs may be sequential indicating an order for reconstructing the message based on the block content. Furthermore, each successive block (i.e., after the first block in the chain) includes a hash value 316 of a previous block thereby linking the content such that it cannot be manipulated. Here, the hash value 316 may include message content or some other block content from a previous block. In the example of FIG. 3A, the block 323 includes a hash value of content from previous block 322.

FIG. 3B illustrates an example of a previous message in a blockchain being linked to a current message in the blockchain. In this example, the current message may be a reply or a forward of the previous message. In this example, the first two blocks 323 and 324 correspond to the last two blocks in FIG. 3A. These blocks are from a current email that is in reply to a previous email and they include a common message identifier. Meanwhile, a block ID pair is added to the last block 324 in the message that identifies the previous message and thereby links together the current message (reply) with the previous message. For example, the block ID pair may include a message ID of 100 which links to blocks 331 and 332 of message 100. It should also be appreciated that the block ID pair may be added to another part of the chain of blocks such as a different block or it may even be added as a separate block. Accordingly, the block ID pair links together a previous email which begins with blocks 331 and 332.

In some embodiments, blocks may be linked together in different ways. For example, messages may be internal to a particular area such as a company, a server, etc. In this example, the implementation may cover all the emails in the communication stream. In such implementation, each block may contain a serial number of the block in the chain (unique ID), an email_doc_id (common ID), actual message content of the block, a hash of an actual content portion of a previous block, and any specific property (like information if that is an encrypted block. The email_doc_id and serial number may be stored as a pair and any block can have multiple such pairs. When a new email is constructed, the data block will have only one pair. When an email is replied to, it will have two pairs including one for the original email, and one for the Reply email. Similarly, a signature block can have linkage to multiple emails sent by the same sender.

On the content, for blocks which can be common across emails, the reference to the content may stored. For example, names, address book, employee id, employee name, email address, signature, etc. which can be common across multiple emails/messages may be stored in a database and accessed based on an ID, etc. The content of a "To:" block may contain employee Id and an identifier specifying that the email address has to be gathered from the Names & Address book of this Employee. Meanwhile, for blocks that are not common such as the mail body, the content may stored. The blocks may be linked to each other using the combination of unique serial number and common email id. While re-constructing the chain of blocks, the cryptographic hash helps in validating the linking and ensuring that the integrity is maintained. When reconstructing the email, the server may pull the chain of blocks using serial numbers and email id, validate the linking using the cryptographic hash validation, reconstruct the blocks where the information needs to be gathered from common databases, and reconstruct the email as the chain of blocks.

In another example, where the emails move from one server/one organization to another, the flow & mechanism may remain the same. However, the definition of what is common information across email may change. For example, the signature, email id etc. may no longer be common information blocks, so they may not be stored in databases (as they do not have the unique key like Employee id). Instead the common information blocks may be fields such as the trailer messages for specific servers. For example, when XYZ.com sends out an email, it always appends a disclaimer block at the end. This can be stored at servers based on past history and maintained as common information blocks.

Figure 4:
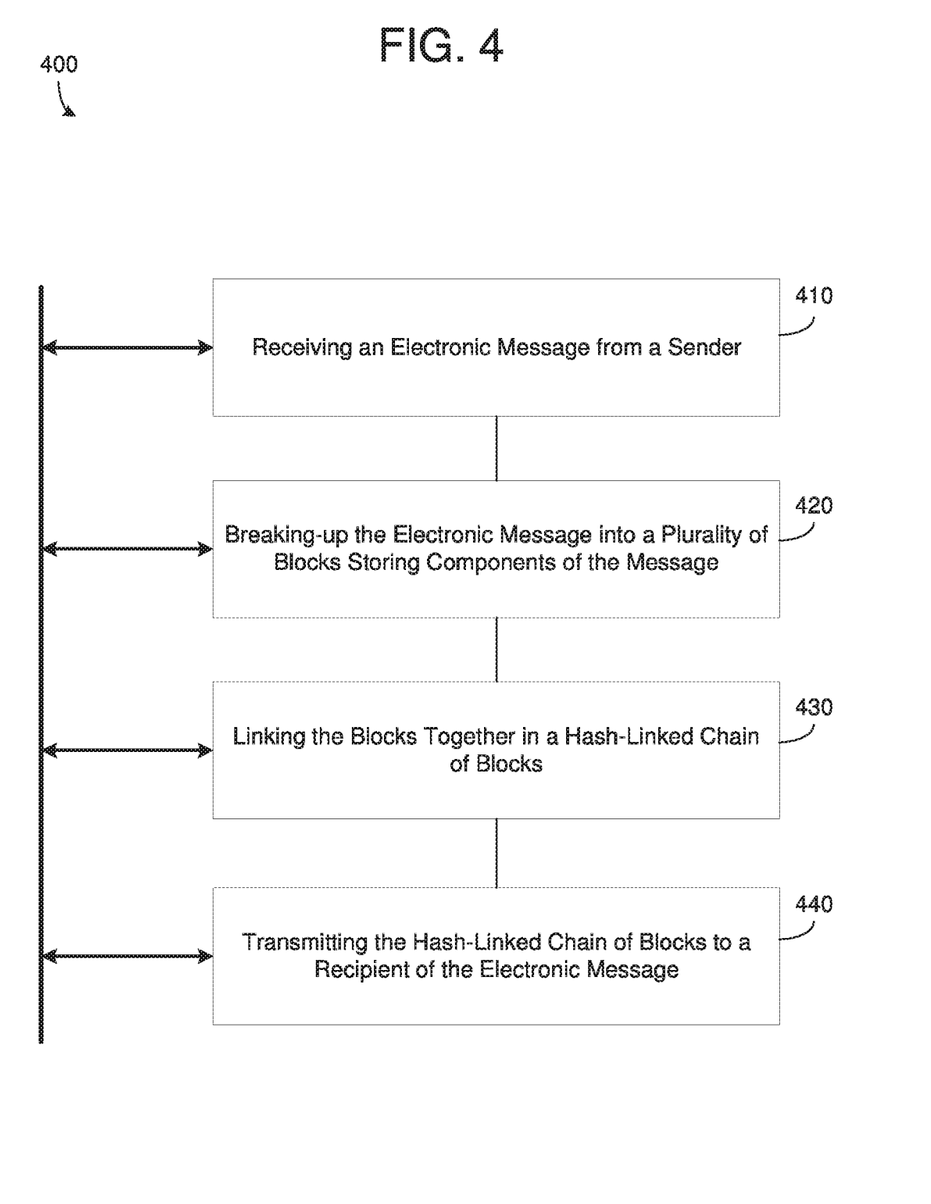
FIG. 4 is a diagram illustrating a method of breaking up an electronic message into a hash-linked chain of blocks, according to example embodiments.

FIG. 4 illustrates a method 400 of breaking up an electronic message into a hash-linked chain of blocks, according to example embodiments. For example, the method 400 may be performed by a computing system such as a web server, a messaging server, or the like. As another example, the method 400 may be performed by a cloud platform, a local computer, multiple computing systems, or the like. Referring to FIG. 4, in 410, the method may include receiving an electronic message from a sender that is intended for a recipient. As described herein, an electronic message may include an email, a text message, an instant message, and the like, which may be transmitted and received over a network. Examples may include an email message having a SMTP message protocol.

In 420, the method includes breaking-up the electronic message into a plurality of blocks where each block stores a respective message component of the electronic message. Each electronic message may have certain components (e.g., SMTP, etc.) such as a sender, one or more recipients, carbon copy recipients, blind carbon, copy recipients, a subject, a body, images, attachments, a signature, and the like. Each component may be stored in its own respective logical block. As another example, a component or message part may be spread out over more than one block instead of being stored in only one block. The blocks may include identification values such as a common message ID that is common to all blocks from a same message, and a block ID which is unique to each block in the same message.

In 430, the method may include linking the plurality of blocks of the broken-up electronic message together in a chain such that each successive block in the chain includes a hash of content included in a previous block of the chain. For example, after the blocks are generated and contain respective message components, the blocks may be linked together via a hash function. For example, for each successive block in the hash-linked chain of blocks, the linking may include generating a hash of block content included in a previous block in the hash-linked chain of blocks and inserting the hashed block content in the successive block in the hash-linked chain of blocks In 440, the method may include transmitting the hash-linked chain of blocks of the broken-up electronic message via a network to the recipient. In some embodiments, prior to transmitting the blocks, the method may include inserting a common message identifier into each of the plurality of blocks of the hash-linked chain of blocks of the broken-up electronic message which commonly identifies each block as being associated with a common electronic message, and inserting unique block IDs into each block that distinctly identifies each block from a same message.

Figure 5:
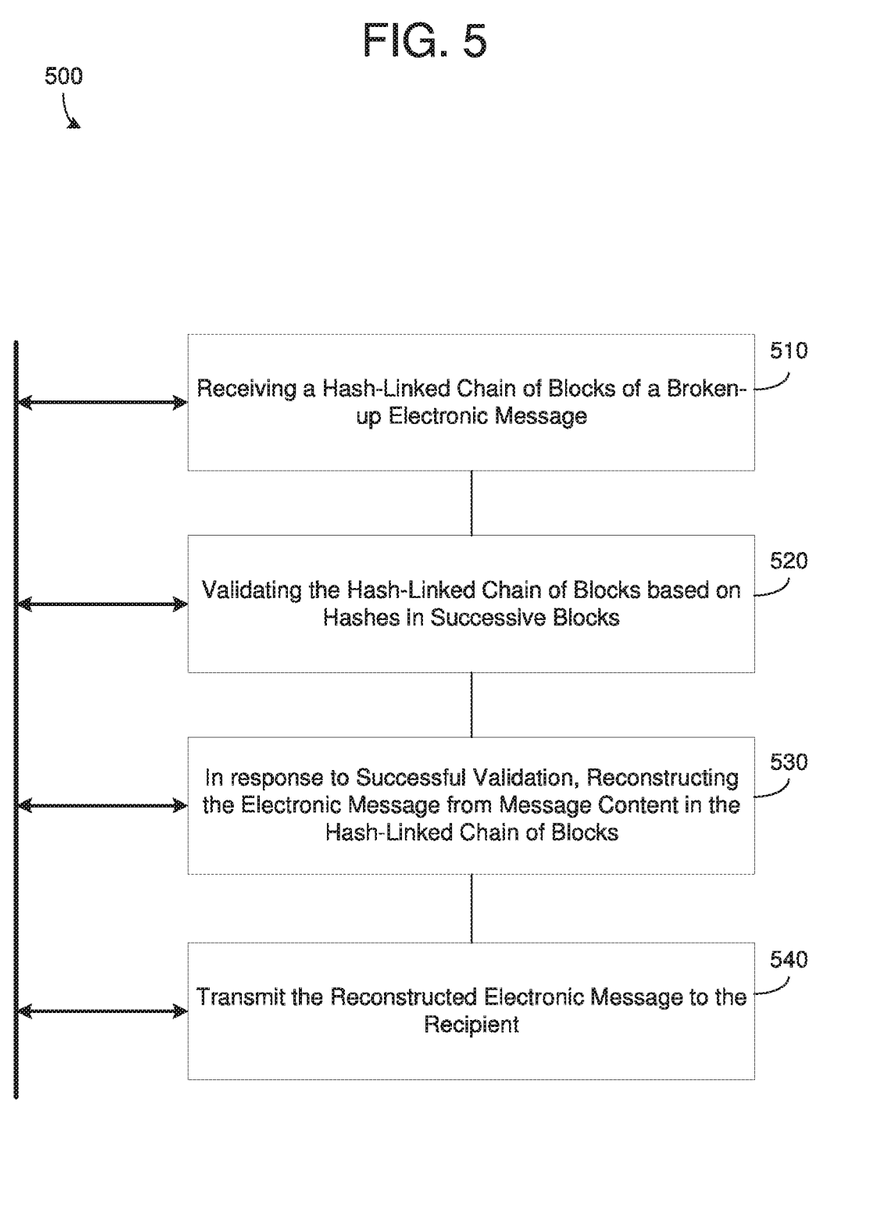
FIG. 5 is a diagram illustrating a method of reconstructing an electronic message from a hash-linked chain of blocks, according to example embodiments.

FIG. 5 illustrates a method 500 of reconstructing an electronic message from a hash-linked chain of blocks, according to example embodiments. For example, the method 500 may be performed by a computing system such as a web server, a messaging server, or the like. As another example, the method 500 may be performed by a cloud platform, a local computer, multiple computing systems, or the like. Referring to FIG. 5, in 510, the method may include receiving a hash-linked chain of blocks that are generated by breaking-up an electronic message into a plurality of blocks.

For example, each block in the hash-linked chain of blocks may include a part of an electronic message, a message ID, a block ID, and a hash value of a previous block in the chain. The hash value may include a value that is within the previous block in the chain and that is hashed using an encryption key known to the server.

In 520, the method may include validating the hash-linked chain of blocks via a hash validation that verifies hashed message content included in each successive block in the chain of blocks. Each successive block in the hash-linked chain of blocks may include hashed message content from a previous block in the chain. According to various embodiments, the hash validation process may detect hashed content included in a block in the chain of blocks, decrypt the hashed content, and compare the decrypted content to the corresponding original content in the previous block to verify that they are the same. Each successive block in the chain of blocks may be validated in the same way to ensure the integrity of the chain of blocks. In response to validating the hash-linked chain of blocks, in 530 the method may reconstruct the electronic message based on message content that is included in the hash-linked chain of blocks. Here, the message may include various parts that are included in respective blocks.

Each block may include multiple IDs including a common message ID that is the same for all blocks of the same electronic message, and a separate block ID which is different for each block in the same electronic message and identifies the respective block with respect to other blocks in the same chain. The server may assemble the electronic message based on a the IDs of the blocks that are stored in each block. For example, a sender of the message may be stored in a first block, a receiver may be stored in a second block, etc. Here, each of the first and second blocks may have the same common message ID while having different block IDs. The sequence may be identified by block IDs (or sequential IDs) that indicate which order to assemble the message parts from the respective blocks. Furthermore, in 540 the method may include transmitting the electronic message that has been reconstructed from the hash-linked chain of blocks to the recipient.

For example, the plurality of blocks of the hash-linked chain of blocks of the broken-up electronic message include a respective block for each of a sender, a recipient, a subject, a body of content included in the electronic message, a carbon copy, a blind carbon copy, a signature, one or more attachments, and the like. Each message part may have its own block in the chain of blocks. In some embodiments, the method may verify a signature block of the sender that uniquely identifies the sender within the plurality of blocks in the chain of the broken-up electronic message to ensure that the sender is a valid sender.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
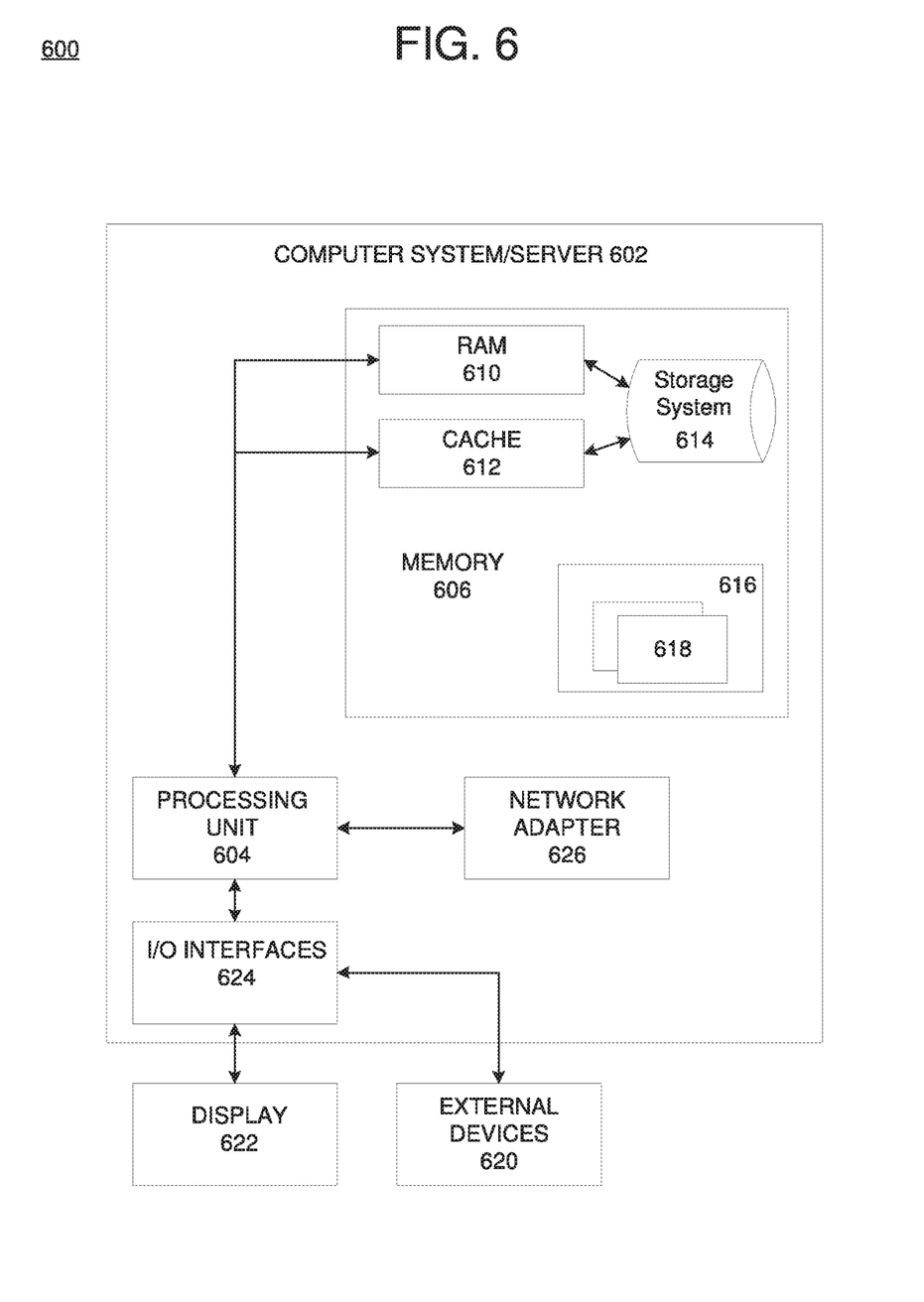
FIG. 6 is a diagram illustrating a computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove. For example, the computing node 600 may be a host server of an electronic messaging platform such as an email server, a messaging server, a cloud platform, and the like.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

According to various embodiments, the processor 604 may receive an electronic message from a sender that is intended for a recipient. For example, the computing node 600 may be an email server that receives an email submitted by a user device by pressing the SEND button. Here, the message may be an electronic communication received by the network adapter 626 via a network. In response to receiving the message, the processor 604 may break-up the electronic message into a plurality of blocks where each block stores a respective message component of the electronic message. For example, each block may store different parts of the message. The processor 604 may link the plurality of blocks of the broken-up electronic message together in a chain such that each successive block in the chain includes a hash of content included in a previous block of the chain. Furthermore, the network interface 626 may transmit the hash-linked chain of blocks to the recipient of the electronic message.

According to another example embodiment, the network interface 626 may receive a hash-linked chain of blocks that are generated by breaking-up an electronic message into a plurality of blocks. In response, the processor 604 may validate the hash-linked chain of blocks via a hash validation that verifies hashed message content included in each successive block in the chain of blocks, and in response to validating the hash-linked chain of blocks, reconstruct the electronic message based on message content that is included in the hash-linked chain of blocks. In this example, the network interface 626 may transmit the electronic message that has been reconstructed from the hash-linked chain of blocks to the recipient.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, offthe-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
    a processor configured to receive an electronic message from a sender that is intended for a recipient, break-up the electronic message into a plurality of blocks where each block stores a respective message component of the electronic message, link the plurality of blocks of the broken-up electronic message together in a chain such that each successive block in the chain includes a hash of content included in a previous block of the chain, and link a block in the chain of the broken-up electronic message to a block within a chain of blocks of a previous broken-up electronic message sent from the sender to the recipient; and
    a network interface configured to transmit a block-structured message in which the hash-linked chain of blocks of the broken-up electronic message are substituted for the electronic message and transmitted to an address of the recipient.

2. The computing system of claim 1, wherein the processor is configured to store each of a sender, a recipient, a subject, and a body of content from the electronic message in separate blocks of the plurality of blocks of the block-structured message.

3. The computing system of claim 2, wherein the processor is further configured to store an attachment of the electronic message into a separate block of the plurality of blocks of the block-structured message.

4. The computing system of claim 1, wherein, for each successive block in the hash-linked chain of blocks, the processor is configured to generate a hash of a message part from the previous block in the hash-linked chain of blocks and insert the hashed message part in the successive block in the hash-linked chain of blocks.

5. The computing system of claim 1, wherein the processor is further configured to insert a common message identifier into each of the plurality of blocks of the hash-linked chain of blocks of the block-structured message which commonly identifies each block as being associated with a same electronic message.

6. The computing system of claim 1, wherein the processor is further configured to insert sequential identifiers into the plurality of blocks of the hash-linked chain of blocks of the block-structured message which identifies a block sequence that is used to assemble the plurality of blocks.

7. The computing system of claim 1, wherein the electronic message comprises one or more of a reply message and a forward message with respect to the previous electronic message.

8. The computing system of claim 1, wherein the processor is further configured to insert a signature block that uniquely identifies the sender within the plurality of blocks of the block-structured message.

9. A computing system comprising:
    a network interface configured to receive a block-structured message comprising a hash-linked chain of blocks that are generated from an electronic message broken-up into a plurality of blocks; and
    a processor configured to validate the hash-linked chain of blocks via a hash validation that verifies hashed message content included in each successive block in the chain of blocks, and validate a link to a previous broken-up message based on an identifier of the previous broken-up message stored in a block of the successive chain of blocks, and in response to successful validation, reconstruct the electronic message based on message content included in the hash-linked chain of blocks,
    wherein the network interface is further configured to transmit the reconstructed electronic message that has been reconstructed from the hash-linked chain of blocks in place of the block-based message to the recipient.

10. The computing system of claim 9, wherein the plurality of blocks of the hash-linked chain of blocks of the block-structured message include a respective block for each of a sender, a recipient, a subject, and a body of content included in the electronic message.

11. The computing system of claim 10, wherein the plurality of blocks further include a separate block for one or more attachments included in the electronic message which is linked together with the respective blocks of the sender, the recipient, the subject, and the body of content in the block-structured message.

12. The computing system of claim 9, wherein each successive block in the hash-linked chain of blocks of the block-structure message includes a hashed message part from a previous block in the chain.

13. The computing system of claim 9, wherein the processor is configured to reconstruct the electronic message based on a common message identifier commonly included in each of the plurality of blocks in the hash-linked chain of blocks, and unique sequential identifiers that are uniquely included in respective block of the plurality of blocks.

14. The computing system of claim 9, wherein the processor is further configured to reconstruct the previous electronic message based on an identification of the previous electronic message included in a last block of the hash-linked chain of blocks of the electronic message.

15. The computing system of claim 9, wherein the processor is further configured to verify a signature block of the sender that uniquely identifies the sender within the plurality of blocks in the chain of the broken-up electronic message.

16. A method comprising:
receiving an electronic message from a sender that is intended for a recipient;
breaking-up the electronic message into a plurality of blocks where each block stores a respective message component of the electronic message;
linking the plurality of blocks of the broken-up electronic message together in a chain such that each successive block in the chain includes a hash of content included in a previous block of the chain and linking a block in the chain of the broken-up electronic message to a block within a chain of blocks of a previous broken-up electronic message sent from the sender to the recipient; and
transmitting a block-structured message in which the hash-linked chain of blocks of the broken-up electronic message are substituted for the electronic message and transmitted to an address of the recipient.

17. The method of claim 16, wherein the breaking-up of the electronic message comprises storing each of a sender, a recipient, a subject, and a body of content from the electronic message in separate blocks of the plurality of blocks of the block-structured message.

18. The method of claim 17, wherein the breaking-up of the electronic message further comprises storing an attachment of the electronic message into a separate block of the plurality of blocks of the block-structured message.

19. The method of claim 16, wherein, for each successive block in the hash-linked chain of blocks, the linking comprises generating a hash of a message part included in a previous block in the hash-linked chain of blocks and inserting the hashed message part in the successive block in the hash-linked chain of blocks.

20. The method of claim 16, further comprising inserting a common message identifier into each of the plurality of blocks of the hash-linked chain of blocks of the block-structured message which commonly identifies each block as being associated with a common electronic message.

21. The method of claim 16, wherein the transmitting comprises transmitting the substituted block-structured message from a messaging server associated with the sender to a messaging server associated with the recipient.

22. The computing system of claim 1, wherein the processor is configured to store an identifier of a block in the chain of blocks of the previous broken-up electronic message within a last block of the chain of the block-structured message.

* * * * *